May 26, 1964 W. KAUFMANN 3,134,616
DOUBLE-CONICAL NIPPLE JOINT FOR CARBON ELECTRODES
Filed Nov. 6, 1959 3 Sheets-Sheet 1

May 26, 1964  W. KAUFMANN  3,134,616
DOUBLE-CONICAL NIPPLE JOINT FOR CARBON ELECTRODES
Filed Nov. 6, 1959   3 Sheets-Sheet 2

May 26, 1964  W. KAUFMANN  3,134,616
DOUBLE-CONICAL NIPPLE JOINT FOR CARBON ELECTRODES
Filed Nov. 6, 1959  3 Sheets-Sheet 3

3,134,616
DOUBLE-CONICAL NIPPLE JOINT FOR CARBON ELECTRODES

Waldemar Kaufmann, Meitingen, near Augsburg, Germany, assignor to Siemens-Planiawerke Aktiengesellschaft fur Kohlefabrikate, Meitingen, near Augsburg, Germany, a corporation of Germany
Filed Nov. 6, 1959, Ser. No. 851,398
Claims priority, application Germany Nov. 7, 1958
11 Claims. (Cl. 287—127)

My invention relates to a butt joint between graphite or other carbon electrodes for electric furnaces and other electric purposes, and particularly to electrode joints that comprises a double-conical threaded nipple plug of electrode material whose two conically tapering portions are in threaded engagement with respective conical socket recesses in the butt faces of the coaxially aligned electrodes. Such butt joints serve to join a new electrode with the end of a nearly consumed electrode to permit continuous furnace operation by replenishing the electrode material in accordance with the rate of consumption.

In a more particular aspect, the invention concerns electrode butt joints of the type disclosed in the copending application Serial No. 725,953, filed April 2, 1958, by Kaufmann, Ragoss, Fitzer and Gress, now Patent No. 2,957,716, assigned to the assignee of the present invention, wherein the thread flanks that on each of the two nipple cones face away from the butt faces of the electrodes are spaced from the adjacent socket-thread flanks a distance approximately equal to the corresponding spacing between the respective thread flanks of the other cone and socket.

Referring to nipple junctions of this type, it is an object of my invention to provide simple and easily applicable means which not only secure a symmetric position of the nipple while the screw joint is being made in cold condition, but which also minimize any disturbance of the thermal expansion of the connecting nipple during heating of the joint and prevent the relatively great expansion of the nipple from exerting excessive pressure upon the screw thread of the electrode sockets.

According to my invention, I provide one or more spacer means between one or a few of those helical thread flanks of nipple and socket that face away from the butt faces of the joint, these spacer means consisting of a material resistant to deformation at the high temperatures to which the joint is subjected during operation of the electrode. The spacer means may consist of a metal strip of a sufficiently high melting point and rigidity to prevent its deformation at the high operating temperatures. Suitable, for example, are spacer pieces of aluminium, copper, zinc, iron of alloys of these metals, although metals of still higher melting points are also applicable. The graphite or carbon substance of the electrode is so soft that a spacer ring of metal, for example, if located in only one or a few turns of the screw thread, presses itself into the flanks when the nipple expands or the socket contracts, without endangering the socket. This is particularly so if the spacer element does not fully cover the entire surface of the thread flank but only a fraction thereof.

The invention will be further described with reference to the drawings in which.

Figure 1:
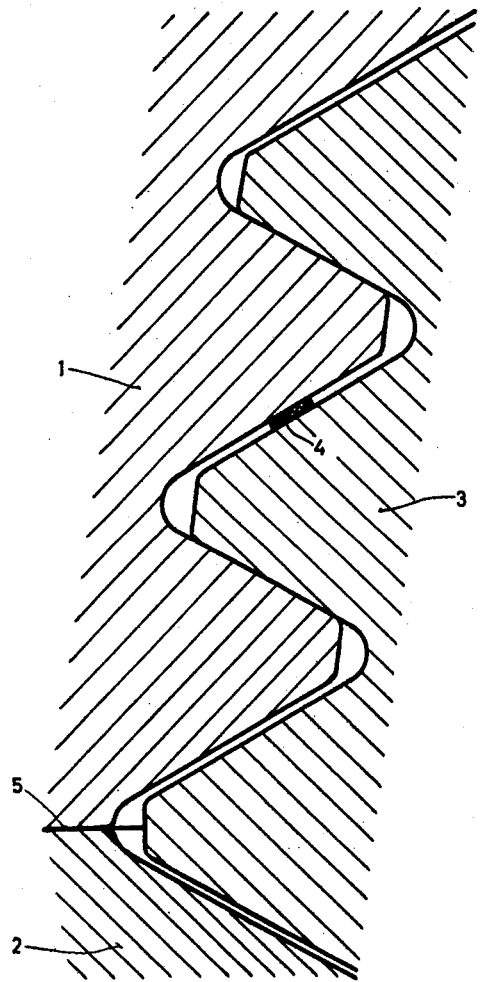
FIG. 1 is a partial and sectional view taken through the socket and nipple of one embodiment of a double-conical nipple joint according to the invention.
Figure 2:
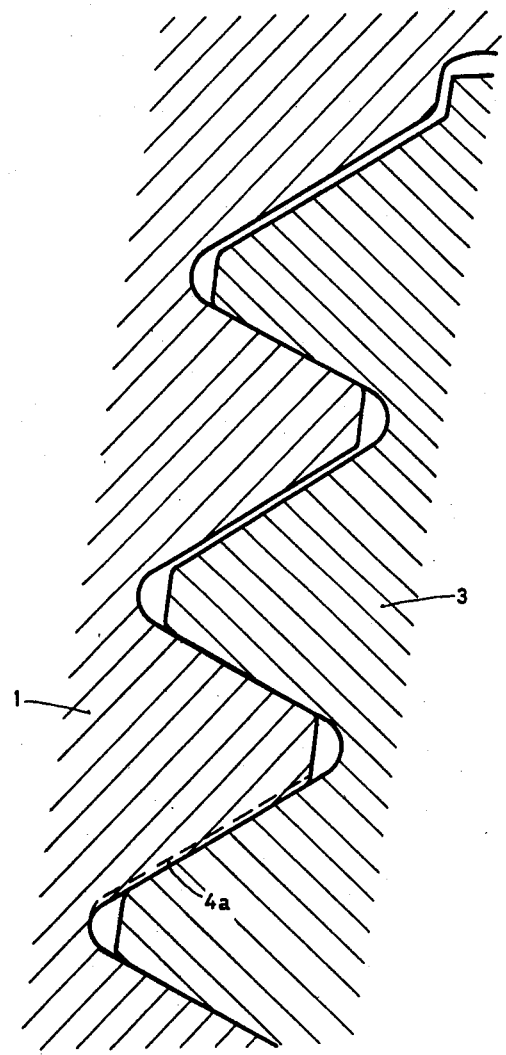
FIG. 2 is a partial and sectional view corresponding to that of FIG. 1, but of another embodiment of the invention.
Figure 4:
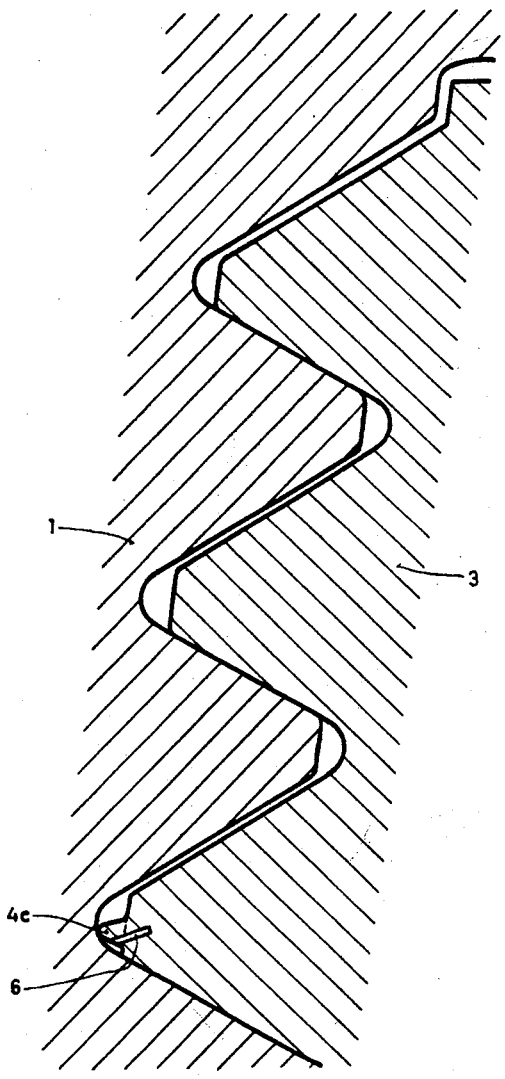
FIG. 4 is a partial and sectional view corresponding to that of FIG. 1, but of a fourth embodiment according to the invention.
Figure 5:
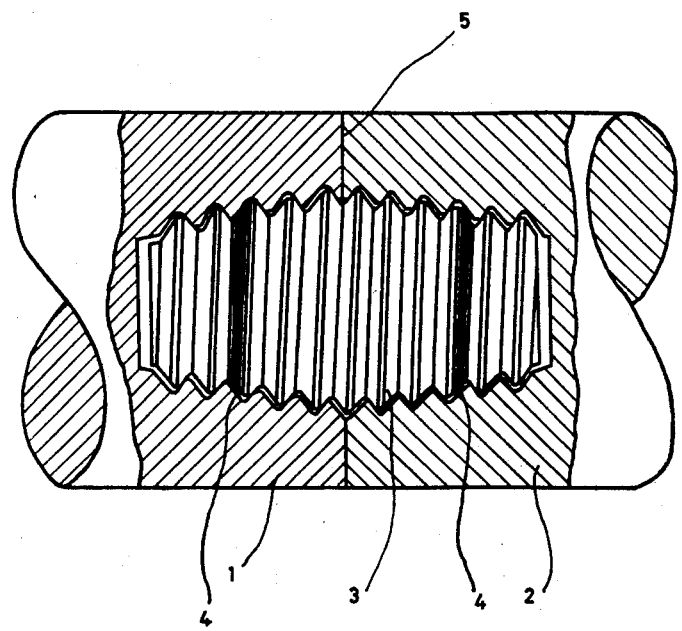
FIG. 5 is a longitudinal cross section through the overall complete nipple junction showing the sockets and double-conical nipple, showing the location of the spacer means according to the invention.

According to FIG. 1, one of the electrode sockets 1 is rigidly joined with a second electrode socket 2 by threaded engagement with a conical nipple 3 which forces the mutually contacting butt faces 5 of the two electrodes into tight engagement with each other. A spacer piece or ring 4 of metal is inserted into one of the turns of the screw thread as explained above. The spacer 4, as well as the spacer means described below with reference to FIGS. 2 to 4, is preferably located near the narrow end of the nipple cone as is apparent from FIG. 5 showing the complete nipple junction.

Instead of using only one spacer ring, a plurality of individual spacer pieces may be distributed over the periphery of the thread. Another way of applying the invention is to place the spacer elements not between the thread flanks but into the base area of the thread.

The spacer element according to the invention, occupying the full width of the thread flank or being narrower than the thread flank, may also consist of the material of the nipple or socket itself; that is, the spacer may form an integral portion of the graphite body of the nipple or socket. In this case, a particularly simple design is achieved by giving one or more thread turns of the nipple or electrode socket a thickness which is greater by the desired amount than the thickness of the other turns. An embodiment of this type is illustrated in FIG. 2, which shows only one of the sockets 1 screwed together with the conical nipple 3. The spacer element 4a is formed by widening one of the thread teeth of the socket 1.

Figure 3:
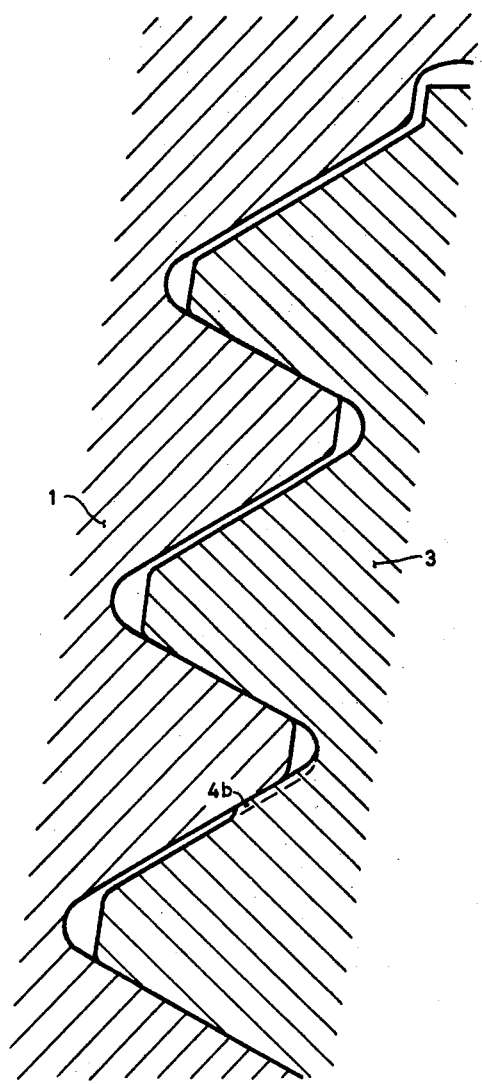
FIG. 3 is a partial and sectional view corresponding to that of FIG. 1, but of a third embodiment of the invention.

Another embodiment involving widening of a thread tooth in a nipple is illustrated in FIG. 3. In this case, the widened portion 4b covers only part of the flank height. It is irrelevant whether the widened portion is located at the tip of the thread, in the middle, or at the base of the thread. The embodiment according to FIG. 3 affords a particularly simple manufacture by means of a milling cutter during the cutting operation anyhow required for producing the screw threads, so that an additional machining operation is unnecessary.

This applies also to the embodiment illustrated in FIG. 4, in which a spacer element 4c is cut into the tip portion of the nipple thread. Under greatly excessive stresses, the cut-out spacer portion 4c may break off but does not cause bursting the electrode. In order to secure breaking at a predetermined location in the event of excessive stresses, the widened spacer portion 4c may be provided with one or more undercuts such as exemplified at 6 in FIG. 4.

Although, as mentioned, the above-described provision of spacer pieces of material deformation-resistant at high temperatures, does not subject the threaded socket of the electrodes to unduly excessive pressure stresses, it is advantageous to locate the spacer element near the narrow end of the conical nipple. At this location the opposite wall of the socket has the greatest thickness, and less material is required for the spacer element.

For the purpose of the invention, it suffices if only one, namely the first screwed-in portion of the double-conical nipple, or only the one corresponding socket, is provided with the above-described spacer means for symmetrical positioning of the nipple. However, such spacer means may also be located on both conical sides of the nipple or in both electrode sockets. This has the advantage that no attention need be given to selecting the correct nipple half or the correct electrode socket when assembling the first screwed-in junction. This also affords the possibility of reliably securing a sufficient clearance between those flanks of the nipple and socket threads that are not provided with spacer elements; that is, when both nipple cones or both sockets are provided with spacers, the proper thread clearance throughout the joint is reliably established when the butt faces are fully tightened against each other.

Instead of providing the spacer elements or inserts on only one or two turns of screw threads, such spacers may also extend over a greater number of turns.

I claim:

1. A carbon-electrode joint, comprising two carbon electrodes coaxially aligned in abutment with each other and each forming a threaded socket in its butt faces, a double-screw nipple having respective threads on each half portion thereof for engaging the respective counter threads of said two sockets, spacer means located between a fractional number of the screw-thread flanks of said nipple and one of said sockets respectively so as to obtain a symmetrical position of the nipple while the screw joint is being assembled in cold condition, said spacer means consisting of a material substantially non-deformable at the operating temperatures of the joint prevailing while said double-screw nipple is performing a supporting function relative to the one of said carbon electrodes depending therefrom, said spacer means being located at a nipple-thread flank facing away from the butt face whereas the other nipple-thread flank directly engages the adjacent socket-thread flank.

2. In a carbon-electrode joint according to claim 1, said spacer means being located closer to a narrow end of said conical nipple than to said butt faces.

3. In a carbon-electrode joint according to claim 1, said spacer means being narrower than said thread flanks relative to the radial height of said flanks.

4. In a carbon-electrode joint according to claim 1, said spacer means consisting of inserted metal strips.

5. In a carbon-electrode joint according to claim 1, said spacer means consisting of electrode carbon.

6. In a carbon-electrode joint according to claim 1, said spacer means consisting of locally thickened portions of one of said respective nipple or socket threads.

7. In a carbon-electrode joint according to claim 5, said spacer means consisting of locally thickened portions forming an integral part of at least one of said respective nipple or socket threads, said thickened portions extending over only part of a thread-flank relative to the radial height of the flank.

8. In a carbon-electrode joint according to claim 1, said spacer means consisting of a thickened thread portion located at the apex of the flank.

9. In a carbon-electrode joint according to claim 1, said spacer means consisting of a thickened and undercut thread portion at the apex of the nipple-thread flank.

10. A carbon-electrode joint, comprising two carbon electrodes coaxially aligned in abutment with each other and each forming a threaded socket in its butt faces, a double-screw nipple having respective threads on each half portion thereof for engaging the respective counter threads of said two sockets, spacer means located between a fractional number of the screw-thread flanks of said nipple and one of said sockets respectively so as to obtain a symmetrical position of the nipple while the screw joint is being assembled in cold condition, said spacer means consisting of a material thermally stable at the operating temperatures of the joint prevailing while said double-screw nipple is performing a supporting function relative to the one of said carbon electrodes depending therefrom, said spacer means being located at a nipple-thread flank facing away from the butt face, the opposing nipple-thread flank facing toward said butt face directly engaging the adjacent socket-thread flank.

11. A carbon-electrode joint according to claim 10, said thermally-stable material comprising the same material as that of said nipple.

References Cited in the file of this patent

UNITED STATES PATENTS

| 1,639,511 | Lafever | Aug. 16, 1927 |
| 2,145,168 | Flagg | Jan. 24, 1939 |
| 2,735,705 | Johnson et al. | Feb. 21, 1956 |
| 2,970,854 | Johnson | Feb. 7, 1961 |

FOREIGN PATENTS

| 271,541 | Germany | Apr. 20, 1925 |